US008757236B2

(12) United States Patent
White

(10) Patent No.: US 8,757,236 B2
(45) Date of Patent: Jun. 24, 2014

(54) APPARATUS AND METHOD FOR SEALING TUBELESS TIRES

(75) Inventor: Michael R. White, Montgomery City, MO (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 484 days.

(21) Appl. No.: 13/081,129

(22) Filed: Apr. 6, 2011

(65) Prior Publication Data

US 2011/0247760 A1    Oct. 13, 2011

Related U.S. Application Data

(60) Provisional application No. 61/321,760, filed on Apr. 7, 2010, provisional application No. 61/403,879, filed on Sep. 23, 2010.

(51) Int. Cl.
*B60C 25/132* (2006.01)

(52) U.S. Cl.
USPC .......... 157/1.13; 157/1.17; 157/1.2; 157/1.21

(58) Field of Classification Search
USPC ................................ 157/1.13, 1.17, 1.2, 1.21
See application file for complete search history.

(56) References Cited

U.S. PATENT DOCUMENTS

| 3,552,469 | A | | 1/1971 | Corless |
| 3,677,320 | A | | 7/1972 | Corless |
| 3,683,991 | A | * | 8/1972 | Ruhland et al. ................. 157/1.1 |
| 3,814,163 | A | * | 6/1974 | Charles et al. ................. 157/1.1 |
| 5,072,764 | A | | 12/1991 | Ochoa |
| 5,247,982 | A | * | 9/1993 | Miller ............. 157/1.1 |
| 5,456,302 | A | | 10/1995 | Demers |
| 5,509,456 | A | * | 4/1996 | Bonko et al. ...................... 157/1 |
| 5,570,733 | A | | 11/1996 | Desparois et al. |
| 5,878,801 | A | | 3/1999 | Ellis |
| 5,884,659 | A | | 3/1999 | Prosser et al. |
| 7,000,667 | B2 | | 2/2006 | Brahler, II |
| 7,017,642 | B2 | | 3/2006 | Brahler, II |
| 7,311,129 | B1 | | 12/2007 | White |

\* cited by examiner

*Primary Examiner* — Lee D Wilson
*Assistant Examiner* — Shantese McDonald
(74) *Attorney, Agent, or Firm* — Baker & Hostetler LLP

(57) ABSTRACT

An apparatus and method to seat a tire on a rim are described. Protrusions and a handle on the apparatus allow a user to brace the protrusions against the rim to prevent blow back when air is vented into the gap between the tire and the rim to seat the tire bead. The air is vented through a plurality of holes in the apparatus and the flow of the air into the apparatus is controlled by positioning a bridge handle of a flow control valve situated between the apparatus and a tank of air.

14 Claims, 3 Drawing Sheets

US 8,757,236 B2

APPARATUS AND METHOD FOR SEALING TUBELESS TIRES

CROSS-REFERENCE TO RELATED APPLICATIONS

This application claims priority to the provisional U.S. patent application entitled Pneumatic Method and Apparatus for Sealing Tubeless Tires, filed Apr. 7, 2010, having a Ser. No. 61/321,760, and the provisional U.S. patent application entitled Self Closing Bridge Handle, filed Sep. 23, 2010, having a Ser. No. 61/403,879, the disclosures of both of which are incorporated herein by reference in their entirety.

FIELD OF THE INVENTION

The present invention relates generally to establishing a seal between the bead of a tire and a rim. More particularly, the present invention relates to a seating apparatus and method to seat a tire on a rim by employing a pneumatic pulse.

BACKGROUND OF THE INVENTION

A challenge associated with changing a tubeless tire is the difficulty associated with establishing the initial seal between the bead of the tire and the bead-seating surface of the rim on which the tire is to be mounted. This difficulty results from the fact that, when a tire is uninflated, the open space or gap between its bead and the bead-seating surface of the rim is often so large that seating is prevented by the leakage of air therethrough. At the same time that the gap renders the tire unable to hold air, the inability of the tire to hold air prevents it from expanding so as to reduce the size of the gap. This problem is more apparent in the case of heavy truck tires, particularly radial truck tires, because the stiffness of such tires makes them resistant to forces that tend to reduce the gap sufficiently for seating to occur.

Accordingly, it is desirable to provide a seating apparatus and method to address at least these issues.

SUMMARY OF THE INVENTION

The foregoing needs are met, to a great extent, by the present invention, wherein in one aspect an apparatus is provided that in some embodiments addresses the challenges discussed above for seating a tire on a rim.

In accordance with one embodiment of the present invention, a seating apparatus for seating a tire on a rim is provided. The seating apparatus includes a rigid body with a plurality of holes to vent air into a gap between the tire and the rim, a pipe coupled to said body at a first side of the body and acting as an inlet for the air entering said body, and two or more protrusions from said body at a second side of said body, the second side being on a different side of a cross-sectional plane of the body from the first side of the body.

In accordance with another embodiment of the present invention, a seating apparatus for seating a tire on a rim is provided. The seating apparatus includes means for discharging air between the tire and the rim, means for channeling the air to the means for discharging, and means for positioning the means for discharging.

In accordance with yet another aspect of the present invention, a method of seating a tire on a rim is provided. The method includes channeling air from a pipe into a rigid body comprising a plurality of holes, positioning protrusions from said body on the rim, and venting the air into a gap between the tire and the rim through the plurality of holes.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
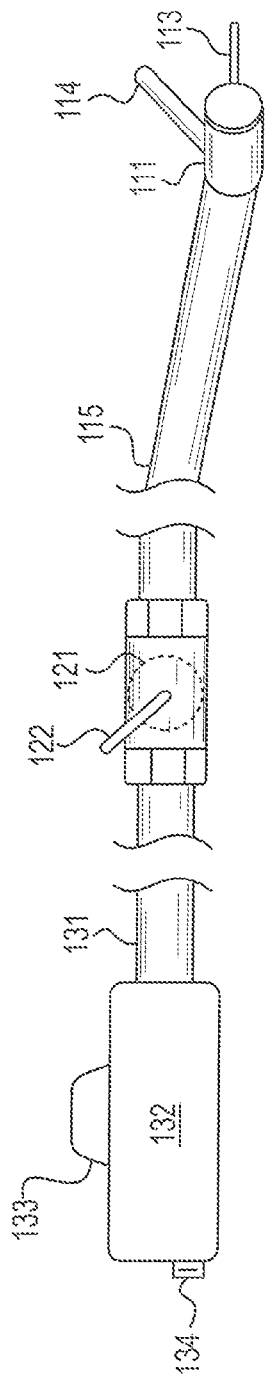
FIG. 1 depicts a seating apparatus in accordance with an embodiment of the invention.

The present invention addresses at least the issues discussed above by providing a bead seating apparatus and method which employ a pneumatic pulse having a leading edge with a short rise time both to impart momentum to the bead and inject air into the tire. This pulse of air thereby initiates a bead motion in the tire which results in the progressive seating thereof. Ease of use and portability are addressed through the inclusion of means to counteract the recoil effect resulting from venting the pulse of air and providing a modular design. The various components of the apparatus described below can be easily disengaged from each other and re-coupled for use.

Referring now to the drawings, like reference numerals designate identical or corresponding parts throughout the drawings.

FIG. 1 depicts a seating apparatus 100 according to an exemplary embodiment. The seating apparatus 100 includes a rigid body 110 including a protrusions 113, a handle 114, and a pipe 115 that can act as an inlet to the rigid body 110. The seating apparatus 100 also includes a flow control valve 121 operated by a handle 122, a hose 131, and a tank 132.

Figure 4:
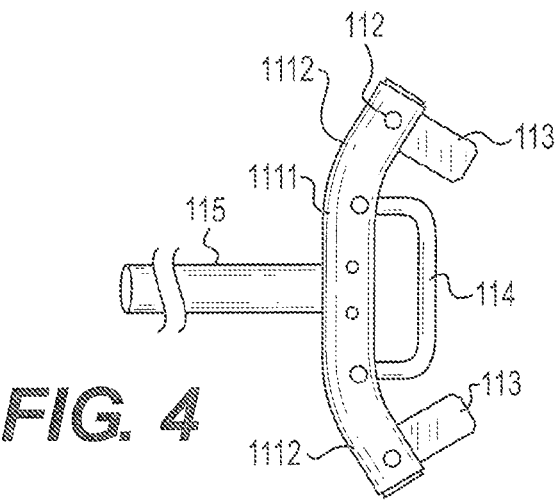
FIG. 4 shows a perspective bottom-up view of the rigid body according to the embodiment shown in FIG. 1.

The body 111 is formed as a hollow bent pipe with a straight portion 1111 in the middle and bent portions 1112 at each end, as shown in FIG. 4. This shape generally follows the curvature of a tire, but the total length of the bent pipe is such that the full length of the body 111 fits in the gap between any unseated standard size tire and rim. The total length of the body 111 may be just over 12 inches, for example.

Figure 2:
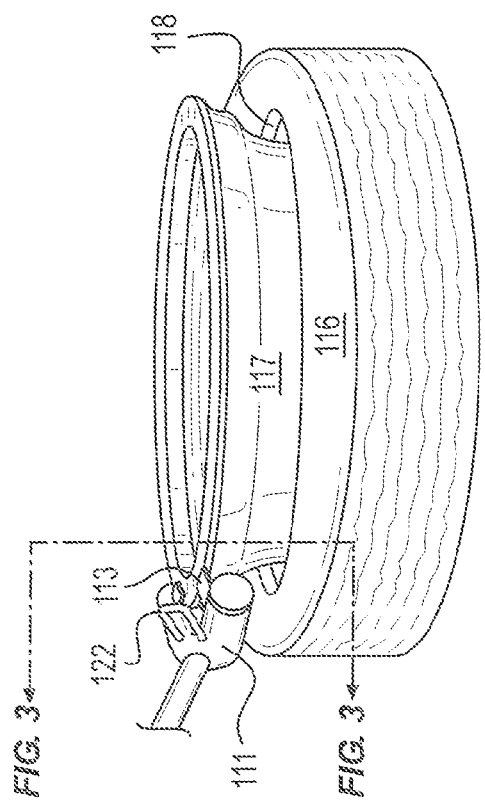
FIG. 2 shows the rigid body positioned to seat a tire on a rim according to the embodiment shown in FIG. 1.

FIG. 2 shows the body 111 positioned to seat a tire 116 on a rim 117. As shown, the protrusions 113 from the body 111 sit atop the rim 117. The holes 112 in the body 111, which are not visible in FIG. 2 because they face the gap 118 between the tire 116 and the rim 117, are positioned to vent a pulse of air into the gap 118 to seat the tire 116 on the rim 117.

Figure 3:
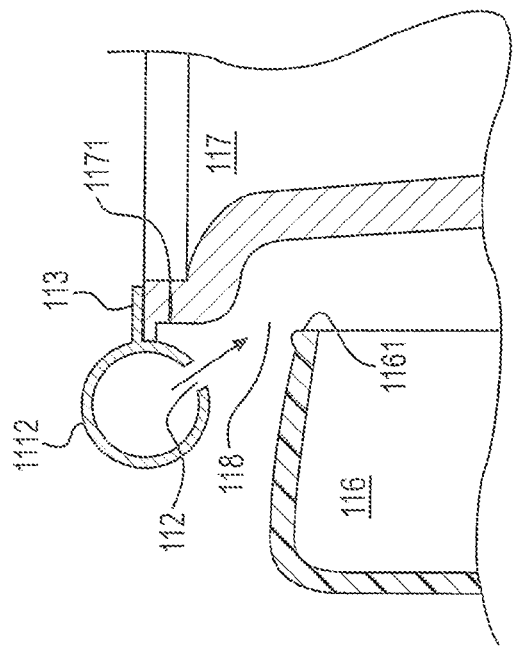
FIG. 3 shows a cross-sectional cut-out view of a tire and rim with the seating apparatus positioned according to the embodiment shown in FIG. 1.

FIG. 3 shows a cross sectional cut-out view of the tire 116 and rim 117 from FIG. 2. As shown, the cross section is at a hole 112 of the body 111 below a protrusion 113 in one of the bent portions 1112 of the body 111. The protrusion 113 of the seating apparatus 111 is arranged on the rim 117 and the hole 112 below the protrusion 113 vents a pulse of air into the gap 118 as illustrated by the arrow. When that pulse of air is released through the hole 112 into the gap 118, the bead 1161 of the tire 116 rises in response to inflation of the tire 116 to fit onto the bead-seating surface 1171 of the rim 117.

FIG. 4 shows a perspective bottom-up view of the body 111 as seen from the gap between the tire 116 and the rim 117. As mentioned with reference to FIG. 2, a pulse of air is vented from the plurality of holes 112 in the body 111 into the gap 118 between the tire 116 and the rim 117. When the pulse of air is vented through the holes 112, a recoil effect is felt by a user holding the seating apparatus 100 similar to the recoil of a gun, for example. To prevent this recoil (also referred to as blow back) against the user of the seating apparatus 100 because of the force of the air being released into the gap, two or more protrusions 113 can be placed on and pressed against the rim using the handle 114. This application of pressure by the user toward the gap can counteract the blow back effect. To further counteract the blow back effect and enhance the pipe 115 may be formed at, for example, a 45 degree angle from the plane of the rim 117 on which the protrusions 113 are placed. The 45 degree angle would allow a user to comfortably apply pressure both downward and forward on the protrusions 113 with the handle 114.

Figure 5:
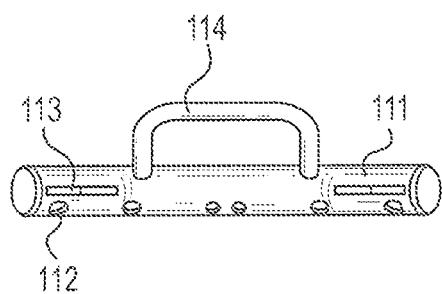
FIG. 5 shows a perspective front view of the rigid body according to the embodiment shown in FIG. 1.

FIG. 5 shows a perspective front view of the body 111 as seen from the center of the rim 117 toward the tire 116 during seating. The plurality of holes 112 in the body 111 need not be the same size. The holes 112 also need not be round but could instead be oblong, square, or any other shape. As shown, one or more holes in the straight portion may be smaller than one or more holes in the bent portion of the body 111. However, in other embodiments, other variations in the sizes of the holes or similar sizes for all the holes is contemplated.

In a preferred embodiment, the holes 112 that are closer to the pipe 115, which acts as the inlet for the air vented through the holes 112, are progressively smaller than the holes 112 farthest away from the pipe 115. That is, the holes 112 at the center in the straight portion 1111 of the body 111 would be smallest, and holes 112 at the ends in the bent portions 1112 of the body 111 would be biggest. With progressively smaller holes 112 closer to the inlet pipe 115 where air pressure is relatively highest and progressively larger holes 112 farthest from the inlet pipe 115 where air pressure is relatively lowest, air flow across the body 111 can be equalized. Even flow across the body 111 maximizes the flow of air into the area of the gap 118 acted on by the body 111.

Referring to the discussion above regarding the size of the body 111, the size of the body 111 and the configuration of the holes 112 represent two of the parameters involved in the compromise between compatibility of the seating apparatus 100 with more sizes of tires and coverage of more of the gap 118 of a given tire 116. On the one hand, a longer body 111 would cover more of the gap 118 and, therefore, increase the flow of air into more of the gap 118. On the other hand, an excessive length that prevents the body 111 from fitting on the rim 117 such that the holes 112 direct air into the gap 118 would be less effective in seating smaller tires.

The pipe 115 channels air into the body 111 when the flow control valve 121 is opened. The flow control valve 121 is, for example, a ball valve operable by a handle 122. FIG. 5 shows a perspective top-down view of a flow control valve 121 with a lever handle 122 operating the flow control valve 121. When the seating apparatus 100 is configured as shown in FIG. 1, the lever handle 122 can be pushed forward toward the body 111 to open the flow control valve 121 and pulled back toward the tank 132 to close the flow control valve 121. As shown in FIG. 1, the placement of the lever handle 122 would encourage a user of the seating apparatus 100 to use his or her right hand to operate the lever handle 122 while using his or her left hand to hold the handle 114 of the body 111. Thus, while both right and left-handed users can operate the seating apparatus 100 shown in FIG. 1, other configurations may better-accommodate left-handed users of the seating apparatus 100.

In a preferred embodiment, the selection of the type of flow control valve 121 and handle 122 is based on the speed with which nearly complete flow can be achieved. By quickly closing the valve 121, air is preserved in the tank 132 to seat more tires without replenishing the tank 132. For example, the handle 122 may be a bridge handle. In addition, ease of use by both right and left-handed users is preferable.

Figure 6:
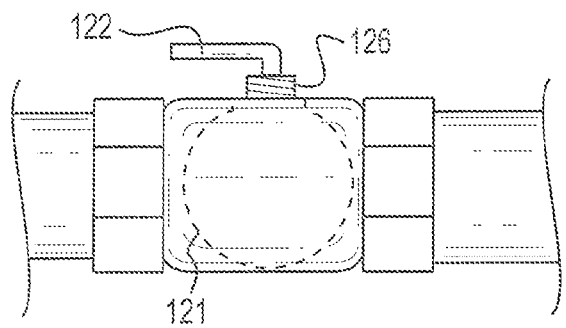
FIG. 6 shows a perspective top-down view of a flow control valve according to an embodiment of the invention.
Figure 7:
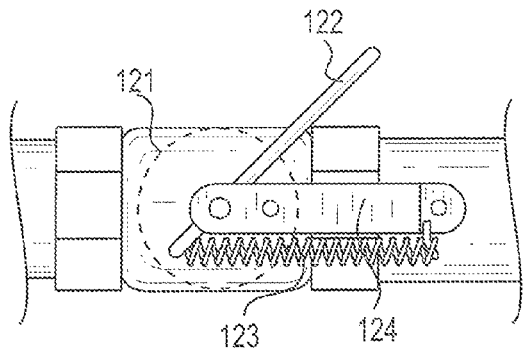
FIG. 7 shows a perspective side view of the flow control valve in an open position according to the embodiment shown in FIG. 1.

FIG. 6 shows a perspective side view of the flow control valve 121 with a bridge handle 122 in a position (toward the body 111) to open the flow control valve 121. Unlike the lever handle 122 shown in FIG. 5, the bridge handle 122 is more comfortable to use from either side of the seating apparatus 100. In the position shown in FIG. 6, a spring 123, which is attached to the bridge handle 122 on one end, is extended such that it quickly moves the bridge handle 122 back to the position (toward the tank 132) in which the flow control valve 121 is closed, shown at FIG. 7. As FIG. 7 shows, the spring 123 is in a neutral compressed state when the bridge handle 122 is in the position in which the flow control valve 121 is closed.

Figure 8:
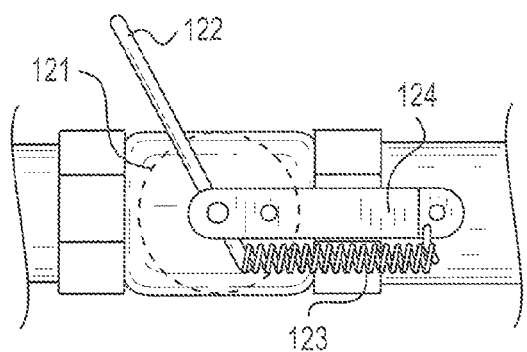
FIG. 8 shows a perspective side view of the flow control valve in a closed position according to the embodiment shown in FIG. 1.
Figure 9:
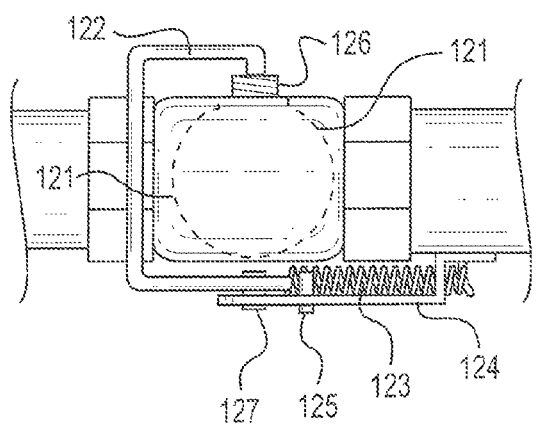
FIG. 9 shows a perspective top-down view of the flow control valve according to the embodiment shown in FIG. 1.

FIG. 8 shows a perspective top-down view of the flow control valve 121 section. The bridge handle 122 attaches to the ball valve 121 on one side via a pin 126 and to a brace 124 on the other side via a pin 127. The movement of the bridge handle 122 is translated to the ball valve 121 via the pin 126.

On the inside of the brace 124, a stop 125 stops the bridge handle 122 when it is pushed toward the body 111 to open the valve 121. The spring 123 then snaps or quickly moves the bridge handle 122 back to the position in which the ball valve 121 is closed. The stop 125 allows a user of the seating apparatus 100 to push the bridge handle 122 to the ball valve 121 open position with full force while allowing quick snap back. The stop 125 is, for example, a steel stop that can withstand repeated use without wearing out and failing. As a result, a pulse of air enters the gap between the tire 116 and the rim 117.

The quick snap back not only results in a pulse, rather than a stream, of air being vented into the gap between the tire 116 and the rim 117 through the plurality of holes 112 but also allows retention of unused air for use in seating one or more additional tires. The pulse of air is used in the seating process in the following manner. A single high energy pulse of air produces motion of the tire bead and an internal pressure wave within the gap with aggregates the tire bead movement.

Air comes to the valve 121 through a hose 131 from a tank 132. The hose 131 flexibility may enhance portability and ease of use of the seating apparatus 100. However, the hose 131 could instead be a rigid conduit. The tank 132 includes a handle 133 that allows portability of the seating apparatus 100. As the tank 132 size and, thus, the volume of air it can store increase, the number of tires that can be seated with the seating apparatus 100 prior to refilling the tank increases. However, increased size and capacity of the tank 132 inversely affects portability of the tank 132 by increasing its weight. The portability of the tank 132 affects whether a tire can easily be seated on the side of the road, for example, rather than only in a shop environment.

The tank 132 also includes an inlet valve 134. The inlet valve 134 can be connected to any source of air and, preferably, compressed air. Once the tank 132 is filled to a predetermined volume, the source can be disconnected from the inlet valve 134 to allow portability of the seating apparatus 100 including the tank 132.

Typically, the tire is also supplied with a steady flow of air through a valve stem mounted on the rim 117. While this steady flow is not necessary for seating the tire 116 on the rim 117, it is helpful to maintain the seat once it is established. The supply of the steady flow of air may be the tank 132 itself with an additional outlet line.

In another non-limiting embodiment, a method of seating a tire on a rim is described.

A user operating the seating apparatus 100 would hold the handle 114 with one hand and operate the bridge handle 122 with the other hand. The design of the seating apparatus 100 allows either hand to be used for either handle while facing the rigid body 111. The protrusions 113 are positioned on the rim 117 so that the plurality of holes 112 vent air into the gap between the tire 116 and the rim 117. By holding the handle 114, pressure can be applied to hold the protrusions 113 against the rim 117 and prevent the blow back from the force of the air entering the gap 118. The bridge handle 122 can be operated to open the flow control valve 121 by pushing the bridge handle 122 forward (toward the body 111) with full force. The stop 125 and spring 123 act to stop the forward movement of the bridge handle 122 and reposition it to a position at which the flow control valve 121 is closed.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A seating apparatus for seating a tire on a rim, comprising:
    a rigid body formed as a hollow pipe closed on both ends, said body including a plurality of holes;
    a pipe coupled to said body at a first side of said body and configured to introduce air into said body;
    two or more protrusions from said body at a second side of said body, the second side being on a different side of a cross-sectional plane of the body from the first side of the body;
    a handle coupled to said body, wherein the pipe forms a 45 degree angle with a plane formed by the protrusions, and the handle is positioned on said body such that, when the two or more protrusions are positioned on the rim, a user holding the handle applies downward and forward pressures to the two or more protrusions against the rim to counteract blow back from venting of the air into the tire.

2. The seating apparatus of claim 1, wherein the plurality of holes and the two or more protrusions are arranged such that when the two or more protrusions are placed on the rim, the plurality of holes are positioned to vent the air into a gap between the tire and the rim.

3. The seating apparatus of claim 1, wherein said body is formed as a bent tube with a straight portion in a middle and bent portions at each end, the body being closed at the bent portions, wherein the plurality of holes increase in size from an inner-most part of said body, in the straight portion of said body, to outer edges of said body, in the bent portions of said body, and wherein when the two or more protrusions are placed on the rim, the straight portion of said body is closer to the tire than the bent portions of said body, and the bent portions of the body are closer to the rim than the straight portion of said body.

4. The seating apparatus of claim 1, wherein the two or more protrusions are located at bent portions of the body.

5. A seating apparatus for seating a tire on a rim, comprising:
    a rigid body formed as a hollow pipe closed on both ends, the body including a plurality of holes;
    a pipe coupled to the body at a first side of the body and configured to introduce air into the body;
    two or more protrusions from the body at a second side of the body, the second side being on a different side of a cross-sectional plane of the body from the first side of the body;
    a flow control valve coupled to the pipe, the flow control valve operable to control flow of the air to the pipe for venting through the plurality of holes;
    a bridge handle to operate the flow control valve, the bridge handle when in a first position opens the flow control valve and closes the flow control valve when in a second position; and
    a spring coupled to the bridge handle such that, when the bridge handle is moved to the first position, the spring action repositions the bridge handle to the second position.

6. The seating apparatus of claim 5, wherein the bridge handle is positioned toward the pipe and said body in the first position, the bridge handle is positioned away from the pipe and said body in the second position, and the spring extends from the bridge handle toward the pipe and said body.

7. The seating apparatus of claim 5, further comprising:
    a tank coupled to the flow control valve through a hose or pipe, the tank storing at least the air vented through the plurality of holes to seat the tire on the rim.

8. The seating apparatus of claim 7, wherein the tank is configured to store at least two times a volume of the air vented in a gap between the tire and the rim to seat a second tire on a second rim without refilling the tank.

9. A method of seating a tire on a rim, the method comprising:
- channeling air from a pipe into a rigid body comprising a plurality of holes;
- coupling a flow control valve to an inlet of the pipe to control the channeling of the air into said body;
- positioning protrusions from said body on the rim;
- venting the air into a gap between the tire and the rim through the plurality of holes; and
- positioning a bridge handle at a first position and a second position to open and close the flow control valve, respectively, wherein the bridge handle is coupled to a spring and when the bridge handle is positioned in the first position, the spring action repositions the bridge handle to the second position.

10. The method of claim 9, further comprising:
- holding a handle coupled to said body to apply pressure on the protrusions from said body against the rim.

11. The method of claim 10, wherein said body is formed as a bent tube with a straight portion in a middle and bent portions at each end, and the holding the handle includes positioning the bent portions closer to the rim than the straight portion and positioning the straight portion closer to the tire than the bent portions.

12. The method of claim 9, wherein the positioning at the first position includes positioning the bridge handle toward said body, and the positioning at the second position includes positioning the bridge handle away from said body.

13. The method of claim 9, further comprising:
- accumulating a volume of air including the air channeled into said body in a tank, wherein the air is vented into the gap as a pulse.

14. The method of claim 13, wherein the volume of air in the tank is at least two times a volume of the air vented in the gap between the tire and the rim, and the method further comprises seating a second tire on a second rim without refilling the tank.

* * * * *